(12) United States Patent  
Creighton et al.

(10) Patent No.: US 9,602,975 B2  
(45) Date of Patent: Mar. 21, 2017

(54) INTELLIGENT SURFACING OF REMINDERS (71) Applicant: MICROSOFT TECHNOLOGY LICENSING, LLC, Redmond, WA (US)

(72) Inventors: Jason Timothy Creighton, Redmond, WA (US); Amol Wankhede, Redmond, WA (US); Eric Horvitz, Redmond, WA (US); Ajoy Nandi, Redmond, WA (US); Melissa N. Lim, Redmond, WA (US); Mangesh Deshpande, Redmond, WA (US); Paul Koch, Redmond, WA (US); John Charles Krumm, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 14/720,136

(22) Filed: May 22, 2015

(65) Prior Publication Data

US 2016/0345132 A1 Nov. 24, 2016

(51) Int. Cl.
*H04W 4/02* (2009.01)
*G06Q 10/10* (2012.01)
(Continued)

(52) U.S. Cl.
CPC ........ *H04W 4/028* (2013.01); *G01C 21/3438* (2013.01); *G01C 21/3697* (2013.01);
(Continued)

(58) Field of Classification Search
CPC .. H04W 4/028; H04W 4/021; G01C 21/3697; G01C 21/3438; H04M 1/72566; G06Q 10/109
(Continued)

(56) References Cited

U.S. PATENT DOCUMENTS 7,233,229 B2 6/2007 Stroupe et al.
7,528,713 B2 5/2009 Singh et al.
(Continued)

FOREIGN PATENT DOCUMENTS

CA 2620587 A1 4/2007
WO 03213796 A2 3/2003
WO 2013155619 A1 10/2013

OTHER PUBLICATIONS

Gordon, Whitson, "How to Turn Your Phone Into a Mind-Reading Personal Assistant", Published on: Sep. 10, 2012, Available at: http://lifehacker.com/5950162/how-to-turn-your-phone-into-a-mind-reading-personal-assistant.
(Continued)

*Primary Examiner* — Tyler J Lee
(74) *Attorney, Agent, or Firm* — Dave Ream; Tom Wong; Micky Minhas (57) ABSTRACT

Calendar and scheduling applications organize and display user events and provide event reminders. A method of triggering a reminder includes accessing a reminder which describes an event. An individual associated with the event, other than the user, is identified. A future time is predicted when the user will be within proximity of the individual. A time to trigger the reminder for presentation to the user is determined, such that the time to trigger the reminder occurs in advance of the predicted future time when the user will be within proximity of the individual. Based on a determination that the time for triggering the reminder has occurred, the reminder is triggered to be presented to the user.

20 Claims, 5 Drawing Sheets (51) Int. Cl.
*H04M 1/725* (2006.01)
*G01C 21/34* (2006.01)
*G01C 21/36* (2006.01)

(52) U.S. Cl.
CPC ...... *G06Q 10/109* (2013.01); *H04M 1/72566* (2013.01); *H04W 4/021* (2013.01)

(58) Field of Classification Search
USPC ........................................................ 701/516
See application file for complete search history.

(56) References Cited

U.S. PATENT DOCUMENTS

| | | | | |
|---|---|---|---|---|
| 7,847,686 | B1* | 12/2010 | Atkins | G06Q 10/109 340/539.11 |
| 7,925,995 | B2 | 4/2011 | Krumm et al. | |
| 8,375,320 | B2 | 2/2013 | Kotler et al. | |
| 8,380,804 | B2* | 2/2013 | Jain | G06Q 10/109 709/207 |
| 8,504,404 | B2* | 8/2013 | Norton | G01C 21/3407 705/7.19 |
| 8,537,003 | B2 | 9/2013 | Khachaturov et al. | |
| 8,560,232 | B2 | 10/2013 | Coughlin et al. | |
| 8,682,300 | B2 | 3/2014 | Stopel et al. | |
| 8,700,709 | B2 | 4/2014 | Axelrod et al. | |
| 8,892,128 | B2 | 11/2014 | Gehrke et al. | |
| 8,948,821 | B2 | 2/2015 | Newham et al. | |
| 9,125,019 | B1* | 9/2015 | Heikkila | H04W 4/023 |
| 2002/0055924 | A1 | 5/2002 | Liming | |
| 2004/0128067 | A1* | 7/2004 | Smith | G01C 21/26 701/516 |
| 2006/0058948 | A1 | 3/2006 | Blass et al. | |
| 2006/0224319 | A1* | 10/2006 | Rogers | G06Q 10/109 701/516 |
| 2007/0129888 | A1* | 6/2007 | Rosenberg | G01C 21/20 701/433 |
| 2007/0277113 | A1* | 11/2007 | Agrawal | G06Q 10/109 715/764 |
| 2008/0004926 | A1 | 1/2008 | Horvitz et al. | |
| 2009/0015402 | A1* | 1/2009 | Reifman | H04M 1/72566 340/540 |
| 2012/0136572 | A1* | 5/2012 | Norton | G01C 21/3407 701/465 |
| 2012/0158289 | A1* | 6/2012 | Bernheim Brush | G01C 21/3484 701/425 |
| 2013/0267253 | A1 | 10/2013 | Case et al. | |
| 2013/0307681 | A1* | 11/2013 | Borg | G06Q 10/109 340/517 |
| 2014/0070945 | A1 | 3/2014 | Dave et al. | |
| 2014/0206391 | A1 | 7/2014 | Perotti | |
| 2014/0278057 | A1 | 9/2014 | Berns | |
| 2014/0278091 | A1 | 9/2014 | Horvitz et al. | |
| 2015/0143281 | A1 | 5/2015 | Mehta et al. | |
| 2015/0309723 | A1* | 10/2015 | Zhu | H04M 1/72566 715/771 |
| 2015/0365796 | A1* | 12/2015 | Toni | H04W 4/022 701/522 |

OTHER PUBLICATIONS

Marmasse, et al., "Location-aware Information Delivery with Commotion", In Proceedings of Second International Symposium HUC, Sep. 25, 2009, 15 pages.
Gordon, Whitson, "What's New in Android 4.1 Jelly Bean", Published on: Jun. 27, 2012. Available at: http://lifehacker.com/5921761/whats-new-in-android-41-jelly-bean.
Davidoff, et al., "Learning Patterns of Pick-ups and Drop-offs to Support Busy Family Coordination", In Proceedings of Conference on Human Factors in Computing Systems, May 7, 2011, 10 pages.
Savage, et al., "I'm feeling LoCo: A Location Based Context Aware Recommendation System", In Proceedings of 8th International Symposium on Location Based Services, Nov. 21, 2011, 20 pages.
"Geofencing, Start to Finish (XAML)", Published on: Apr. 13, 2014, Available at: http://msdn.microsoft.com/en-us/library/windows/apps/xaml/dn342943.aspx.
"Gimbal.com", Retrieved on: Apr. 16, 2015, Available at: http://www.talllink.com/domain/gimbal.com.
"MobiLinc Geo-fence and Push Notification Commercial", Published on: May 24, 2013, Available at: https://www.youtube.com/watch?v=2kPeUivB-M.
Duffy, Jill, "Get Organized: Using Location-Based Reminders", Published on: Jun. 30, 2014, Available at: http://www.pcmag.com/article2/0,2817,2460207,00.asp.
Kaji, et al., "Location-Aware Reminders with Personal Life Content on Place-Enhanced Blogs", In Proceedings of the 8th International Symposium on Web and Wireless Geographical Information Systems, Dec. 11, 2008, 2 pages.
Caldwell, Serenity, "Geofencing Alerts to Come to Find My Friends this Autumn", Published on: Jun. 18, 2012, Available at: http://www.macworld.co.uk/news/apple/geofencing-alerts-come-find-my-friends-autumn-3364585/.
Neil, Patil, "Geobells: Location Reminders", Published on: Aug. 22, 2014, Available at: https://play.google.com/store/apps/details?id=com.patil.geobells.lite&hl=en.
Sohn, et al., "Place-Its: A Study of Location-Based Reminders on Mobile Phones", In Proceedings of the 7th International conference on Ubiquitous Computing, Sep. 11, 2011, 19 pages.
"Outlook 2010 and 2013 Calendar Features", Published on: Nov. 14, 2011, Available at: https://www.cites.illinois.edu/exchange/outlook2010-cal.html.
International Search Report and Written Opinion Issued in PCT Application No. PCT/US2016/033384, Mailed Date: Jul. 1, 2016, 11 Pages.

* cited by examiner

INTELLIGENT SURFACING OF REMINDERS

BACKGROUND

Calendar and scheduling applications and services generally organize and display a user's activities, tasks, jobs, appointments, meetings, and other types of events. They may also provide event reminders or notifications that are presented to a user based on the date and time of an event. Existing services may be limited to presenting or triggering a reminder at the time of an event, a default time period before the event, or at some time period specified by a user, which may or may not provide enough advance notice to the user. Some approaches to triggering reminders are based on geofencing and/or detecting communication with an individual associated with a reminder.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In various embodiments, systems, methods, and computer storage media are provided for triggering an event reminder or notification to a user at a relevant time based on contextual information. A reminder may be triggered based on information such as calendar information, user profile information, and/or one or more conditions such as frequently visited locations, frequently traveled routes, travel time, meeting participants, proximity to another individual, and so forth. In an embodiment, another individual associated with the reminder is identified, and a future time is predicted for when the user is expected to be within proximity of the other individual. The time to trigger the reminder may then be based on some amount of time in advance of when the user is expected to be within proximity of the other individual.

BRIEF DESCRIPTION OF THE DRAWINGS

The present invention is described in detail below with reference to the attached drawing figures, wherein.

DETAILED DESCRIPTION

Triggering an event reminder or notification in a user device in advance of an associated event or task may provide the user with enough time to travel and/or make whatever preparations may be needed for the event or task. Contextual information may be utilized to determine how far in advance to surface, or trigger, a notification. Contextual information about an event may be determined from user profile information such as frequently visited locations, frequently traveled routes, locations associated with an event, individuals associated with the user, locations associated with the user, a user's current location, and so forth. Contextual information about an event may also be determined from other information in the user's calendar and/or information from another user's calendar. In an embodiment, contextual information in combination with data or parameters associated with a reminder is utilized to determine a relevant time to surface the reminder. A relevant time may include a time far enough in advance of an event that allows the user to travel from the current location to the event and arrive by (or before) the time the event is scheduled to occur. A relevant time may include a time prior to a predicted confluence of circumstances that enable an event to occur, such as for an event not tied to a specific time.

As used herein, the term "event" includes occurrences, happenings, planned occasions, tasks to be performed, information to be remembered, and so forth. Thus, by way of example and not limitation, events can include meetings, errands, assignments, special occasions, and generally anything of which a user wishes or needs to be reminded. Some events may be associated with specific locations, times, and/or individuals, such as a work meeting with colleagues in a particular conference room at a specific date and time. However, an event need not be associated with a particular location, time, or individual. For example, the task "buy milk on the way home from work today" does not specify a particular grocery store, and is not associated with an individual (other than the user). The task "check out a book on gardening from the library on 12th Street" does not specify a particular date, time, or individual. The task "pay back Fred the five dollars I owe him" does not specify either a specific date or location. Some embodiments determine a relevant time to trigger a notification for an event regardless of whether the event is tied to specific locations, dates, or times.

In accordance with some embodiments of the present invention, event reminder data is analyzed to identify an individual (other than the user) associated with the reminder/event. Event reminder data may include parameters that are used to configure a reminder, such as locations, dates, times, subjects, references to other users or individuals, and so forth. Another user or individual may be identified based on descriptive terms or names within the reminder data in conjunction with contextual information about the user. Based on contextual information associated with the user, a future time is determined for when the user is predicted, or expected, to be within proximity of the individual that is associated with the reminder. The contextual information may include information such as calendar information, scheduled events, other reminders, known routes historically traveled by the user, known locations historically visited by the user, and so forth. In an embodiment, a future time is determined for when the user is predicted, or expected, to be within proximity of the individual that is associated with the reminder based on a specific event within the user's calendar data. For example, when the user's calendar data includes a second event that is associated with the other individual, the scheduled time of the second event is a future time when the user is expected to be within proximity of the individual. For example, the second event might be a planned dinner with the other individual. Alternatively, the future time when the user is expected to be within proximity of the individual may be based on information from both the user's calendar information (and/or other contextual information) and the other individual's calendar information (and/or contextual information). In an embodiment, the other individual's calendar and/or contextual data may be utilized to determine that the individual will at the same location (or a nearby location) as a future location of the user as determined from the user's calendar and/or contextual data. Users may be provided with an option to allow their calendar information and/or other portions of their contextual information to be accessed for the purpose of coordinating events with certain other users. As used herein, the term proximity refers to an amount of distance and/or travel time falling within a threshold value, where the threshold value is designated as an amount of distance or travel time which is acceptable to suggest that a user travel to accomplish a task, event, and so forth. For example, if the user needs to perform a task related to another individual (e.g., pay Joe twenty dollars), the proximity threshold is a five-minute travel time, and a prediction is made that the user and the other individual will be within a five minute walk (or a five minute drive) of each other when the user is at a particular location, then it is acceptable to present the user with a reminder or suggestion that the task may be performed while at the particular location.

In an embodiment, a trigger time, i.e., an advance time to trigger a reminder, is determined and the reminder is triggered based on the determined trigger time. The trigger time may be determined based on the amount of travel time required to reach the location of the second event. For example, a starting location of the user may be predicted, and a predicted route from the starting location to the location of the second event may be determined. The travel time may be determined based on factors such as the distance along the route, speed limits, traffic patterns, weather conditions, and so forth. In an embodiment, the trigger time may be determined at least in part based on a geofence, e.g., a reminder may be triggered when a user leaves a particular location or arrives at a particular location (such as a workplace, home, a store, and so forth), or may be triggered some determined amount of time before or after the user leaves from, or arrives at, a particular location. The determined amount of time may be determined based on travel time and/or any of the other factors described above.

In an embodiment, reminders are presented at a particular location, or page, within a user interface. For example, a user interface may have a "home" page or a "need to know" section, or some other designated portion of the user interface, where the user can view any outstanding reminders that have surfaced. Thus, when a reminder is triggered, it may be placed in the designated portion of the user interface where it is available to be viewed when the user chooses. Additionally, a reminder may persist in that location of the user interface for some period of time such that the reminder is still presented if the user returns to the designated portion of the user interface at a later time. In an embodiment, a user is not notified that a reminder has been placed in the designated portion of the user interface, but rather must view that portion of the interface to determine whether a reminder has been placed there. In another embodiment, a user may receive a notification, such as an audible tone, a vibration, or a pop-up message, that a reminder has been placed in the designated portion of the user interface. In some embodiments, a reminder is presented directly to the user when the user is viewing other portions of the user interface, either instead of, or in addition to, placing the reminder in the designated portion of the user interface. For example, a reminder may be presented as a pop-up message, dialog box, or other type of unsolicited message. A reminder may also be presented regardless of whether the user is actively viewing the device, and an audible tone or vibration may be utilized to attract the user's attention to view the reminder.

In a first aspect, a method of triggering presentation of a reminder is provided. The method includes accessing the reminder, which describes an event associated with a user of a user device. An individual associated with the first event, other than the user, is identified. A future time is predicted at which the user will be within proximity of the individual. A time to trigger the reminder for presentation to the user is determined, such that the time to trigger the reminder occurs in advance of the future time at which the user is predicted to be within proximity of the individual. A determination is made that the time for triggering the reminder has occurred, and based on the determination, the reminder is triggered to be presented to the user.

In a second aspect, a system for triggering presentation of a calendar event reminder is provided. The system includes one or more computing devices and a data storage configured to store calendar information associated with a user of a user device. The system also includes a data collection component configured to collect contextual information associated with the user, and a data storage that is configured to store the contextual information. Also included in the system is an inference engine configured to access an event reminder that describes an event associated with a user of a user device, identify an individual associated with the event, other than the user, and determine a future time when the user is predicted to be within a predetermined proximity of the individual, determine a time to trigger the reminder for presentation to the user, such that the trigger time will occur a period of time prior to the future time when the user is predicted to be within the predetermined proximity of the individual. The system also includes a reminder surfacing component configured to determine that the time for triggering the reminder has occurred and trigger the reminder to be presented to the user.

In a third aspect, a method of triggering presentation of a calendar event reminder is provided. An event reminder that describes an event associated with a user of a user device is accessed. An individual associated with the event, other than the user, is identified. A future time is predicted at which the user will be within a predetermined proximity of the individual at a point along a route which the user is predicted to travel. A time to trigger the reminder for presentation to the user is determined, such that the time to trigger the reminder occurs a period of time prior to the predicted future time when the user will be within the predetermined proximity of the individual. A determination is made that the time to trigger the reminder has occurred, and the reminder is triggered to be presented to the user.

Figure 2:
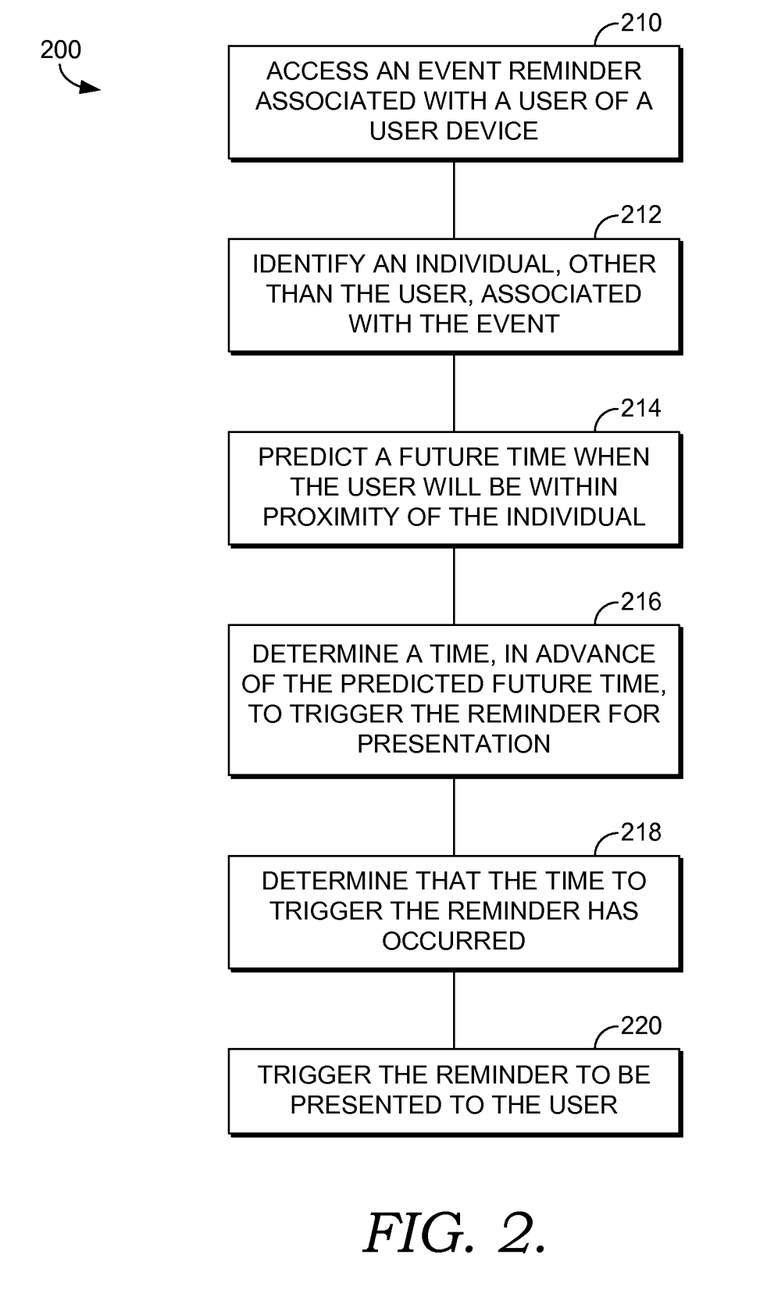
FIG. 2 depicts a flowchart of an exemplary method of triggering presentation of a reminder suitable for use with an embodiment of the present invention.

Referring initially to FIG. 2 in particular, a flowchart depicts an exemplary method of triggering presentation of a reminder suitable for use with an embodiment of the invention, and is generally referred to as method 200. Method 200 is merely an example of one suitable method and is not intended to suggest any limitation as to the scope of use or functionality of the invention. Neither should method 200 be interpreted as having any dependency or requirement relating to any single component or combination of components illustrated therein.

At a step 210, a reminder is accessed which describes an event associated with a user of a user device. The user device may be a user device similar to computing device 100 described below with regard to FIG. 1. The reminder may include information about an event such as a task, a happening, a gathering, a special occasion, a meeting, a location, a date, a time, one or more other individuals, and so forth. The reminder may be stored in memory on the user device as part of a calendaring application, scheduling application, or other type of application that stores and utilizes reminders. The reminder may alternatively be stored remotely, such as on a network server that communicates with the user device and manages reminders for multiple user devices. Examples of reminders that are to be presented to the user might include "buy milk at the Acme Grocery Store after work tonight," "meet with Sam and Tom in Conference Room 15 at 2:00 pm on Jun. 4, 2015," "pay Joe the twenty dollars I owe him," and so forth. In an embodiment, a reminder need not be associated with a specific individual, a specific location, or a specific date/time.

At a step 212, an individual (other than the user) is identified that is associated with the event. In the example reminders described above, Sam and Tom are individuals associated with the meeting reminder, and Joe is an individual associated with the reminder to repay a loan. One difference between those two reminders is that the meeting reminder is associated with a location and a date/time, whereas the reminder to repay the loan is not associated with either a location or a time. The individual may be identified in a variety of ways. Based on an identifying term or name (e.g., "Joe," "Tom Smith," "the kids," and so forth) the individual may be identified from a user profile associated with the user, which stores contextual information about the user. Examples of contextual information that might be helpful in identifying an individual include indications of family members, friends, coworkers, and generally any persons that are associated with the user, and may also include indications of the type of relationship or association the user has with the individuals. In an embodiment, a user may designate particular individuals as members of an "inner circle" associated with the user. Members of the inner circle may be assigned various priority levels which may be utilized when surfacing a reminder. For example, a user's spouse may be designated as a member of the inner circle, whereas the user's realtor may not be. In that event, when a reminder associated with the spouse and a reminder associated with the realtor are both surfaced, the reminder associated with the spouse may be presented more prominently, highlighted, or otherwise emphasized, based on the priority of the spouse over the realtor, due to the spouse's designation of being in the user's inner circle. Similarly, a spouse and a friend may both be included in a user's inner circle, but the user may designate the spouse as having a higher priority than the friend. Thus, a reminder associated with the spouse would be given emphasis over the reminder associated with the friend, even though both are in the inner circle, based on the priority assigned to each. Other examples of individuals that a user might prefer to prioritize include children, other family members, a work supervisor, and so forth.

At a step 214, a future time is determined at which the user is predicted to be within proximity of the individual that is associated with the reminder. The future time may be determined based on contextual information associated with the user. The contextual information may include information such as calendar information, scheduled events, other reminders, known routes historically traveled by the user and/or the times they were traveled, known locations historically visited by the user and/or the times they were visited, and so forth. Similarly, known information about the other individual may be used to predict the other individual's location. This may include both: (1) information that is known within the user's contextual information without requiring access to the other individual's personal information (e.g., a calendar invite that includes the individual, a home location for the individual, a work location for the individual, etc.); and (2) information that would require access to the other individual's personal information (e.g., calendar information, reminders, current GPS from the individual's mobile device, and so forth.) The other individual's personal information may be accessible based on permission granted by the other individual. In an embodiment, the permission may be granted based on a designation of one or both individuals as being in the other individual's inner circle. The proximity of the user to the other individual may be determined based on a distance between the user and the other individual, such as a straight-line distance or a distance along a route such as streets, sidewalks, and so forth. The distance need not be determined based only on typical units of measure (e.g., miles, feet, and so forth), but may also be determined based on such factors as whether the user and the individual are within the same building, within a certain number of buildings of each other, and so forth. The proximity may also be based on an amount of travel time between the user and the individual, e.g., an amount of walking time, driving time, or other transportation time.

In an embodiment, the future time is determined based on the user's calendar information. A second event is identified which is associated with the same individual, and which is scheduled at a future time. The scheduled time of the second event is thus identified as the future time at which the user is predicted to be within proximity of the individual. For example, suppose that the reminder is "pay Joe the twenty dollars I owe him." Upon accessing the user's calendar information, another event—"meet Joe for racquetball next Saturday at 3:00 pm"—might be identified. Next Saturday at 3:00 pm may thus be identified as a future time at which the user is predicted to be within proximity of Joe, which would be an opportune time to repay the loan. The second event may be a separate event from the first event. For instance, in the example above, "meet Joe for racquetball next Saturday at 3:00 pm" and "pay Joe the twenty dollars I owe him" may be stored as separate, unrelated events in the user's calendar/reminder information. The two events are thus independent of each other, i.e., either may occur without the other and they are not specifically required to occur at the same time or location.

In the example above, the reminder "pay Joe the twenty dollars I owe him" is not associated with a particular place or time, e.g., is not scheduled to take place at a specific place or time. However, in one embodiment, even if a reminder is associated with a specific time and/or location, a different time and/or location may be determined as an opportune time to perform the task/event, and suggested to the user. For example, suppose that the reminder is "pay Joe the twenty dollars I owe him at church next Sunday." From the user's calendar information, the second event, "meet Joe for racquetball next Saturday at 3:00 pm," may be identified as an earlier opportunity to repay Joe, and a reminder may be surfaced in advance of the racquetball game.

At a step 216, a relevant time to trigger the reminder for presentation to the user is determined. A relevant time may be a time far enough in advance of the second event that the user has time to take whatever actions may be necessary to accomplish any tasks or preparation associated with the reminder. The time to trigger the reminder may be a specific time, or may be based on a geofence, such as when the user leaves from or arrives at a particular location. In an embodiment, a future location of the user is predicted at which the user will be in proximity of the individual at the predicted future time. A starting location of the user is identified, and a route the user will travel from the starting location to the future location is predicted. An amount of required travel time along the predicted route from the starting location to the future location may be determined, and the time to trigger the reminder may be determined based at least in part on the amount of required travel time. For example, if the user is at home next Saturday prior to meeting with Joe, a relevant reminder might trigger before Joe leaves home, so that the user is reminded to take the twenty dollars to the racquetball game. The user's location prior to the scheduled event may be determined based on information gathered from the user's mobile phone, a global positioning system (GPS), or other indications of the user's presence at a particular location. The user's location may also be predicted based on historical travel or visitation patterns stored as part of the user's contextual information. For example, if a determination is made from the contextual information that the user always (or typically) visits a particular coffee shop every Saturday at 2:00 pm, the coffee shop may be predicted to be the user's current location at 2:00 pm that Saturday. A relevant time to trigger the reminder might be at an early enough time that the user is able to visit a local ATM (or return home) to obtain the cash if necessary, and still arrive at the racquetball game on time.

In one embodiment, the starting location is predicted or identified as the current location of the user. In another embodiment, as described above, the starting location is identified based on a predicted future location of the user. For example, the user's user profile data may be accessed to identify historical travel patterns of the user and identify one or more locations the user has frequently visited. In an embodiment, one or more locations may be identified which the user has historically visited around the same time on the same day of the week, or has historically visited prior to visiting the location where the user is predicted to be in proximity to the individual. A most likely starting location may be determined from the historically-visited locations based on a probability or confidence score associated with each of the historically-visited locations. The predicted future location of the user prior to the time the user will be in proximity of the individual is thus identified as the starting location of the user.

In an embodiment, predicting the route the user will travel from the starting location to the future location includes accessing user profile data associated with the user and identifying one or more routes the user has historically traveled from the starting location to the future location. A most likely route may be determined from the routes the user has historically traveled, based on a probability or confidence score associated with each of the historically-traveled routes. The most likely route is thus identified as the predicted route the user will travel from the starting location to the future location.

At a step 218, a determination is made that the time for triggering the reminder has occurred, e.g., based on a correspondence between the current time and a particular predetermined time, or based on a correspondence between the user's current location and a geofence. For example, the trigger time might be 2:30 pm, based on the user's location at the coffee shop, allowing for travel time to the nearest ATM and travel time from the ATM to the racquetball court. At a step 220, once the trigger time has occurred, the reminder is triggered to be presented to the user. In an embodiment, once the reminder is triggered, it is configured to persist for some period of time prior to when the user will be within proximity of the individual. In an embodiment, when a user has multiple user devices, the reminder may be surfaced on any or all of the user devices. If the user has a smartphone and a tablet device, the reminder may surface on both of them. In an embodiment, the reminder may be surfaced on the device currently in use. Alternatively, the reminder may be surfaced on a particular device based on one or more user preferences associated with the reminder or with the user device.

Figure 3:
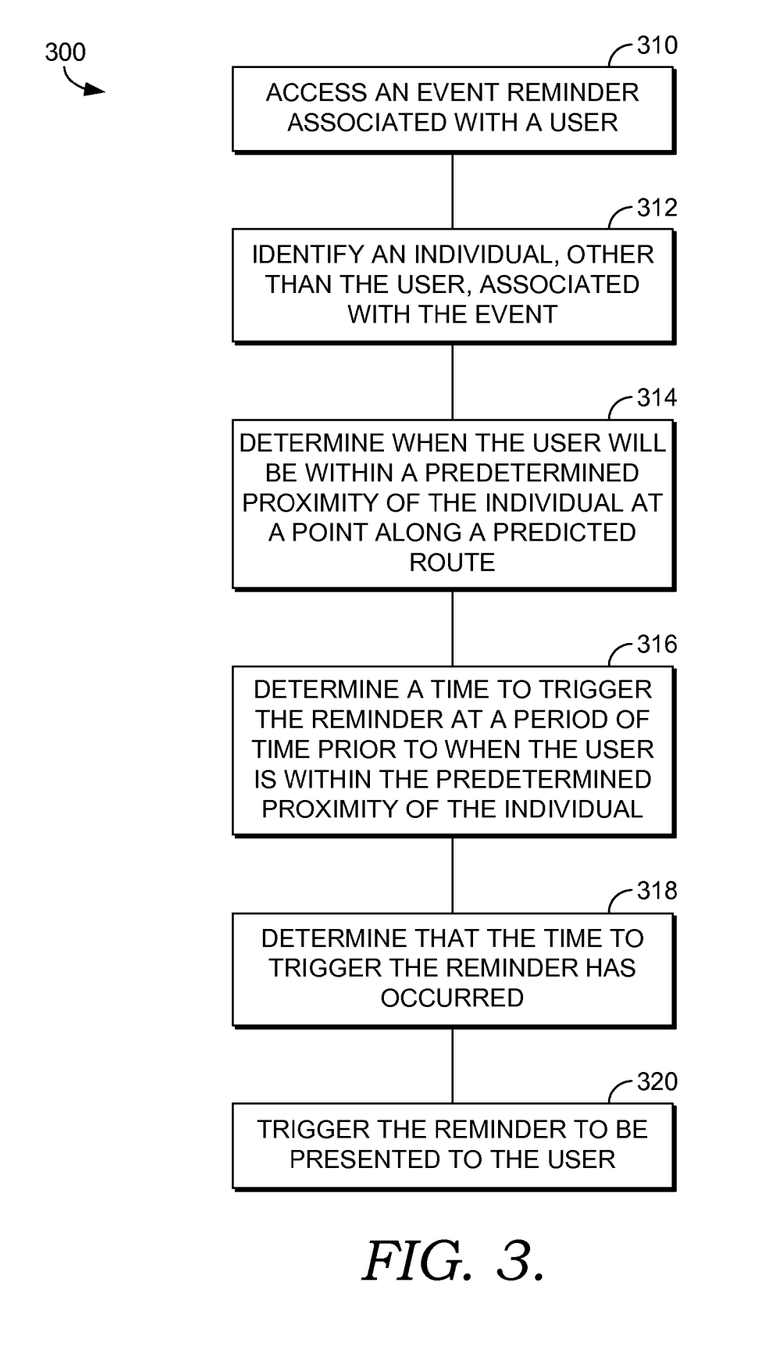
FIG. 3 depicts a flowchart of an exemplary method of triggering presentation of a reminder suitable for use with an embodiment of the present invention.

Referring to FIG. 3, a flowchart depicts an exemplary method of triggering presentation of a reminder suitable for use with an embodiment of the invention, and is generally referred to as method 300. Method 300 is merely an example of one suitable method and is not intended to suggest any limitation as to the scope of use or functionality of the invention. Neither should method 300 be interpreted as having any dependency or requirement relating to any single component or combination of components illustrated therein.

At a step 310, a reminder is accessed which describes an event associated with a user of a user device. The user device may be similar to computing device 100 described below with regard to FIG. 1. The reminder describes an event that is associated in some way with the user of a user device, and is configured to be presented on the user device at a point in time to remind the user of the event. The reminder may include information about an event such as a task, a happening, a gathering, a meeting, a special occasion, a location, a date, a time, one or more other individuals associated with the reminder, and so forth. In some embodiments, a reminder need not be associated with an individual, a location, or a particular date/time. The reminder may be stored on the user device or may be stored remotely, such as in the cloud or on a network server that communicates with the user device and manages reminders for multiple user devices. Examples of reminders that are to be presented to the user might include "deliver quarterly reports to Paul," "buy a jacket at the Acme Clothing Store," "pay Joe the twenty dollars I owe him," and so forth.

At a step 312, an individual (other than the user) is identified that is associated with the event. In the example reminders described above, Paul is an individual associated with delivery of the quarterly reports, and Joe is an individual associated with repaying a loan. There is no individual other than the user associated with buying a jacket. In some embodiments, a reminder need not be associated with a particular individual, location, or date/time. An individual may be identified in a variety of ways. Based on an identifying term or name (e.g., "Paul," "wife," "the kids," and so forth) the individual may be identified from a user profile associated with the user, which stores contextual information about the user. Examples of contextual information that might be helpful in identifying an individual include lists of family members, friends, coworkers, generally any persons that are associated with the user, and an indication of their relationship or association with the user.

At a step 314, a future time is determined at which the user is predicted to be within a predetermined proximity of the individual at a point along a predicted route the user will travel. The proximity of the individual may be determined based on a distance between the point along the predicted route and the individual, such as a straight-line distance or a distance along a route such as streets, sidewalks, and so forth. The proximity may also be based on an amount of travel time between the point along the predicted route and the individual, e.g., an amount of walking time, driving time, or other transportation time. In an embodiment, the proximity is determined based on an amount of distance and/or travel time required to deviate from the predicted route in order to meet up with the other individual.

The future time may be determined based on contextual information associated with the user. The contextual information may include information such as calendar information, scheduled events, other reminders, known routes historically traveled by the user and/or the times they were traveled, known locations historically visited by the user and/or the times they were visited, a home location of the user, a current location of the user, and so forth. Similarly, known information about the other individual may be used to predict the other individual's location. This may include both: (1) information that is known within the user's contextual information without requiring access to the other individual's personal information (e.g., a calendar invite that includes the individual, a home location for the individual, a work location for the individual, and so forth); and (2) information that would require access to the other individual's personal information (e.g., calendar information, reminders, current GPS from the individual's mobile device, and so forth.) The other individual's personal information may be accessible based on permission granted by the other individual.

As one example, suppose the reminder is "pay Joe the twenty dollars I owe him." Upon accessing the user's calendar information, the event "meet with realtor at Acme Realty," scheduled for next Saturday at 3:30 pm, might be identified. A route the user will travel to Acme Realty for the scheduled event may be predicted based at least on one or more of the user's calendar information, the user's user profile, the user's historical travel patterns, a starting location, and so forth. In an embodiment, predicting the route the user will travel includes identifying a route that the user is currently traveling and predicting a remainder of the current route as the route.

Joe's location at the time the user will be traveling the route to Acme Realty may also be predicted. For example, Joe's calendar information may be accessed, and the event "work out at Acme Gym next Saturday at 3:00 pm" might be identified. In some embodiments, Joe's location at the time the user will be traveling the route to Acme Realty is determined from Joe's user profile information and/or Joe's historical travel patterns. A determination may then be made that Acme Gym is within a predetermined proximity of some point along the route the user is predicated to travel to Acme Realty. A time may be predicted at which the user will reach that point along the route, and a determination made that Joe will be at Acme Gym at that time. The predicted time is thus identified as the predicted future time when the user will be within the predetermined proximity of the individual.

In some embodiments, determining the predicted future time when the user will be within proximity of the other individual includes selecting a route, then suggesting the route to the user. For example, a starting location of the user may be identified, and a destination location may be identified to which the user is predicted to travel at a future time. In an embodiment, the destination location for the user is independent of the location where the other individual is predicted to be located, e.g., they are not the same location. One or more potential routes from the starting location to the destination location may be identified based on information such as mapping data, geospatial data, and so forth. A route may be selected from the one or more potential routes based on determining a location where the individual is predicted to be located at a future time, and determining that a point along one of the potential routes is within proximity of the location where the individual is predicted to be located. That route may be suggested to the user, and the future time when the user is predicted to be within proximity of the individual may be determined by identifying a time when the user is predicted to reach the point along the suggested route.

At a step 316, a relevant time to trigger the reminder for presentation to the user is determined. A relevant time may be a time far enough in advance of when the user will be within proximity of the individual that the user has time to take whatever actions and/or preparations may be necessary to accomplish any tasks associated with the reminder. The time to trigger the reminder may be a specific time, or may be based on a geofence, such as when the user leaves from or arrives at a particular location. Additionally, because the user may have no foreknowledge of Joe's whereabouts on Saturday, the reminder may be modified to indicate that Joe will be at Acme Gym when the user is traveling the predicted route. The reminder may also be modified to suggest that the user deviate from the predicted route to stop by the gym and repay Joe. For example, if the user is at home next Saturday prior to traveling to Acme Realty, a relevant reminder might trigger before the user leaves home, presenting a message such as: "pay Joe the twenty dollars I owe him at Acme Gym while traveling to Acme Realty." The reminder thus informs the user of a convenient opportunity to repay Joe, and also serves to remind the user to take the twenty dollars along. The time at which the reminder is triggered may vary, depending on the user's location. For example, Acme Realty might be a fifteen minute drive from the user's home, but if the user is visiting a park with friends, it might be a forty-five minute drive from the park to Acme Realty. The reminder would thus need to be triggered sooner at the park than at the user's home, based on a determined travel time associated with the route from a particular location to Acme Realty. The user's location prior to the scheduled event may be determined based on information gathered from the user's mobile phone, a GPS, cell tower locations, WiFi connections, and/or other indications of the user's presence at a particular location. The user's location may also be predicted based on historical travel or visitation patterns stored as part of the user's contextual information. For example, if a determination is made from the contextual information that the user always (or typically) visits a particular coffee shop every Saturday at 2:30 pm, the coffee shop may be predicted to be the user's location based on that visitation pattern. A relevant time to trigger the reminder might be at an early enough time that the user is able to visit a local ATM (or return home) to obtain the cash if necessary, and still have time to stop by Acme Gym on the way to Acme Realty.

At a step 318, a determination is made that the time for triggering the reminder has occurred, e.g., that the current time corresponds to a particular predetermined time, or based on a geofence. For example, the trigger time might be 2:45 pm, based on the user's location at the coffee shop, allowing for travel time to the nearest ATM and travel time from the ATM to Acme Realty, also allowing time to stop by Acme Gym. At a step 320, once the trigger time has occurred, the reminder is triggered to be presented to the user.

Figure 4:
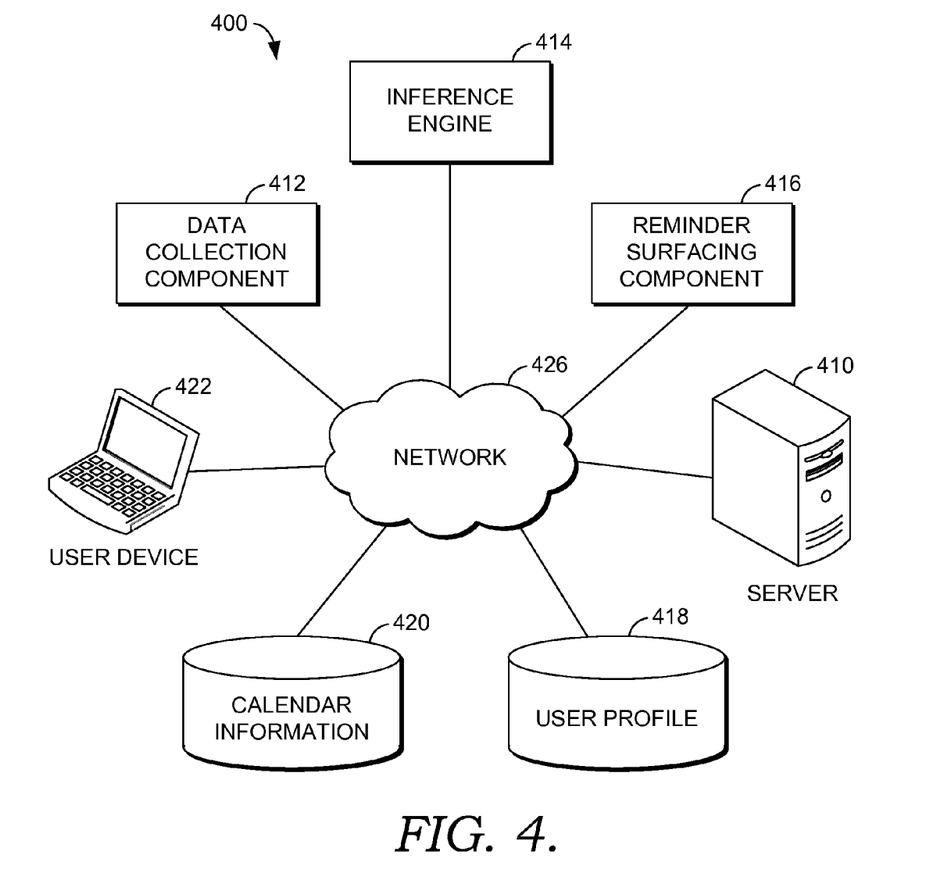
FIG. 4 depicts an exemplary system for triggering presentation of a reminder suitable for use with an embodiment of the present invention.

Referring to FIG. 400, an exemplary system is depicted for triggering presentation of a reminder suitable for use with an embodiment of the invention, and is generally referred to as system 400. System 400 is merely an example of one suitable system and is not intended to suggest any limitation as to the scope of use or functionality of the invention. Neither should system 400 be interpreted as having any dependency or requirement relating to any single component or combination of components illustrated therein. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location.

System 400 includes a server 410, a data collection component 412, an inference engine 414, a reminder surfacing component 416, a user profile data storage 418, a calendar information storage 420, and may optionally include a user device 422. The various components of system 400 may communicate via a network 426.

Server 410 includes one or more computing devices, and may be one server, a plurality of servers, or other computing devices, that are configured to communicate via network 424. Server 410 may comprise one or more applications or services on a user device, across multiple user devices, and/or in the cloud. Data collection component 412 is configured to collect contextual information associated with the user. In an embodiment, the contextual information includes user preferences, identification of individuals associated with the user, frequently visited locations, frequently traveled routes, locations associated with events, locations associated with the user, the user's current location, and so forth. The contextual information may be collected or derived from a variety of sources. In some embodiments, the contextual data may be obtained from one or more sensors, such as sensors providing smartphone data, home-sensor data, GPS data, vehicle signal data, wearable device data, user device data, gyroscope data, accelerometer data, calendar data, email data, schedule data, credit card usage data, purchase history data, weather data, other sensor data that may be sensed or otherwise detected by a sensor (or detector) component, derived from a sensor component associated with the user or an event (including location, motion, orientation, position, user-access, user-activity, network-access, device-charging, or other data that is capable of being provided by one or more sensor component) and many more. Data collection component 412 may also be configured to collect contextual information associated with other individuals that are associated with the user, including individuals associated with the user's calendar events and/or reminders.

User profile storage 418 is configured to store the contextual information that is collected by data collection component 412. User profile storage 418 may include one or more computer storage media and/or one or more computing devices, and may comprise one or more applications or services on a user device, across multiple user devices, and/or in the cloud. User profile storage 418 may include one or a plurality of storage devices. In an embodiment, in addition to the contextual information collected by data collection component 412, user profile storage 418 stores contextual information that is inferred or otherwise derived from the collected data or other information associated with the user. For example, indications of frequently visited locations, frequently traveled routes, regularly attended events, and so forth, which may be inferred from historical location/travel data and calendar data, may be stored.

Calendar information storage 420 may include one or more computer storage media and/or one or more computing devices, and may comprise one or more applications or services on a user device, across multiple user devices, or in the cloud. Calendar information storage 420 stores information related to a user's calendaring applications and/or scheduling applications, or other types of applications that utilize or maintain scheduled events and reminders. Calendaring and scheduling applications generally organize and display a user's activities, tasks, jobs, appointments, meetings, and other types of events. They may also provide event reminders or notifications that are presented to a user based on the date and time of an event. In an embodiment, calendar information storage 420 stores information associated with a plurality of users.

Inference engine 414 may include one or more computing devices configured to derive contextual information associated with a user. Inference engine 414 may comprise one or more applications or services on a user device, across multiple user devices, and/or in the cloud. In an embodiment, inference engine 414 derives contextual information associated with a user based on information accessed from calendar information storage 420 and user profile storage 418. Inference engine 414 is configured to derive various kinds of information that may be utilized to determine when to surface, or trigger, a reminder. For example, in an embodiment, inference engine 414 accesses, within a user's calendar information, an event reminder that describes an event associated with the user. Inference engine 414 identifies an individual, other than the user, associated with the event, and determines a future time at which the user is predicted to be within a threshold proximity of the individual. The proximity of the user to the other individual may be determined based on a distance between the user and the other individual, such as a straight-line distance or a distance along a route such as streets, sidewalks, and so forth. The proximity may also be based on an amount of travel time between the user and the individual, e.g., an amount of walking time, driving time, or other transportation time. In an embodiment, the proximity of the individual is determined based on a distance and/or amount of travel time between the other individual and a point along a route the user is predicted to travel. The proximity may also be determined based on an amount of distance and/or travel time required to deviate from the predicted route in order to meet up with the other individual. A threshold value associated with the proximity, within which the user is determined to be within proximity of the individual, may be determined based on a user preference for a specific distance or specific travel time and/or a predetermined distance or travel time. In an embodiment, a threshold value associated with the proximity is determined at least in part based on the nature of the relationship between the user and the other individual, and/or a priority associated with the other individual. For example, when a task is associated with a close family member, as compared to being associated with a friend, the user may be willing to travel farther to perform the task. In that event, a larger proximity threshold may be used than if the task were associated with the friend. A priority associated with another individual may be based on whether the individual is designated as within the user's inner circle, and/or on levels of priority assigned to individuals within the user's inner circle.

The future time may be determined based on contextual information associated with the user. The contextual information may include information such as calendar information, scheduled events, other reminders, known routes historically traveled by the user and/or the times they were traveled, known locations historically visited by the user and/or the times they were visited, and so forth. Similarly, known information about the other individual may be used to predict the other individual's location. This may include both: (1) information that is known within the user's contextual information without requiring access to the other individual's personal information (e.g., a calendar invite that includes the individual, a home location for the individual, a work location for the individual, etc.); and (2) information that would require access to the other individual's personal information (e.g., calendar information, reminders, current GPS from the individual's mobile device, and so forth). The other individual's personal information may be accessible based on permission granted by the other individual. A time to trigger the reminder for presentation to the user is determined, and may be determined to occur some period of time prior to the future time when the user is predicted to be within proximity of the individual. The time to trigger the reminder may be a specific time, or may be based at least in part on a geofence, such as when the user leaves from or arrives at a particular location. In an embodiment, reminder surfacing component 416 is configured to determine that the time for triggering a reminder has occurred, e.g., that the current time corresponds to a particular predetermined time, or based on a geofence, and trigger the reminder to be presented to the user.

Figure 5:
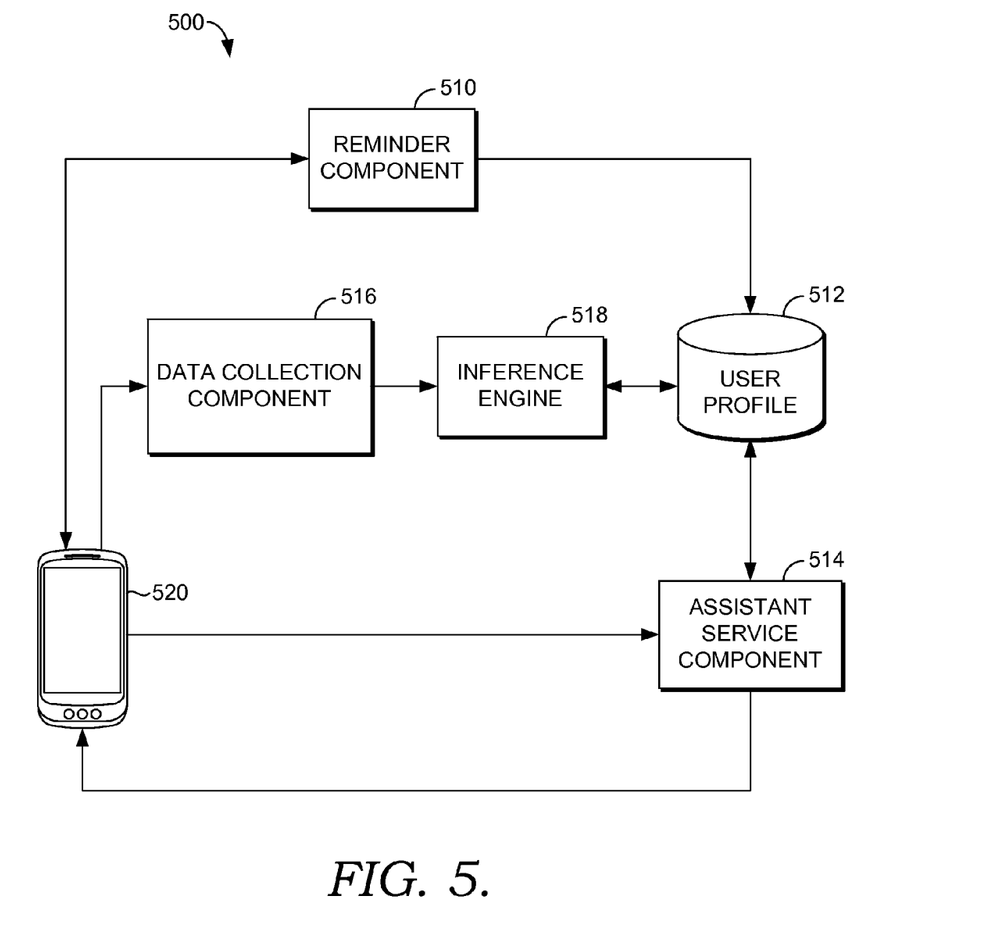
FIG. 5 depicts an exemplary system for triggering presentation of a reminder suitable for use with an embodiment of the present invention.

Referring to FIG. 5, an exemplary system is depicted for triggering presentation of a reminder suitable for use with an embodiment of the invention, and is generally referred to as system 500. System 500 represents only one example of a suitable system and is not intended to suggest any limitation as to the scope of use or functionality of the invention. Neither should system 500 be interpreted as having any dependency or requirement relating to any single component or combination of components illustrated therein. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location.

System 500 includes a reminder component 510, a user profile storage 512, an assistant service component 514, a data collection component 516, and an inference engine 518. System 500 communicates with one or more user devices 520, which are not necessarily part of system 500.

In an embodiment, reminder component 510 includes one or more computing devices configured to manage reminders. Reminder component 510 may comprise one or more applications or services on a user device, across multiple user devices, in the cloud, or a combination thereof. Reminder component 510 communicates with user device 520 and may receive data from user device 520 such as reminder data and contextual user information. Reminder data may include parameters that are used to configure a reminder, such as locations, dates, times, subjects, references to other users or individuals, and so forth. Contextual user information may include current location, local time, GPS and other sensor data, calendar information, user preferences, email data, text message data, and so forth. Contextual information may be stored in user profile storage 512. In an embodiment, reminder component 510 stores and maintains reminders that are to be surfaced, i.e., presented, to the user at some point in time. The stored reminders may include any or all of the reminder parameters described above which are received from user device 520. In an embodiment, the stored reminders include one or more parameters received from inference engine 518. For example, inference engine 518 may provide a trigger time for triggering a particular reminder. Data communicated from reminder component 510 to user device 520 may include reminders to be presented to the user on the user device. In an embodiment, reminder component 510 is configured to determine that the time for triggering a reminder has occurred, and trigger the reminder to be presented to the user. In an embodiment, reminder component 510 ensures that the reminders sync intelligently across devices, e.g., are triggered on appropriate devices of a user depending on which device or devices are currently in use by the user. Reminder component 510 may also resolve or infer some information about an individual named in an event or reminder, such as whether the individual's association with the user is from a work relationship, personal relationship, social relationship, family relationship, and so forth.

User profile storage 512 may include one or more computer storage media and/or one or more computing devices, and may include one or a plurality of storage devices. User profile storage 512 may comprise one or more applications or services on a user device, across multiple user devices, or in the cloud. In an embodiment, user profile storage 512 is configured to store contextual information associated with user device 520 and/or the user of user device 520. The contextual information may be received from reminder component 510, and may also be received from either or both of data collection component 516 and inference engine 518. In embodiment, in addition to the contextual information, user profile storage 512 stores contextual information that is inferred or otherwise derived from other contextual data and/or other information associated with a user. For example, indications of frequently-visited locations, frequently-traveled routes, regularly-attended events, and so forth, as determined from a user's historical travel patterns, may be stored.

In an embodiment, inference engine 518 includes one or more computing devices and may comprise one or more applications or services on a user device, across multiple user devices, and/or in the cloud. Inference engine 518 may be configured to derive contextual information associated with a user based on any of information received from user device 520, calendar information, reminder information, and user profile information. User profile storage 512 may comprise one or more computer storage media and/or one or more applications or services on a user device, across multiple user devices, and/or in the cloud. Inference engine 518 may derive various kinds of information that may be utilized to determine when to surface, or trigger, a reminder. For example, in an embodiment, inference engine 518 accesses an event reminder that describes an event associated with the user. Inference engine 518 identifies an individual, other than the user, associated with the event, and determines a future time at which the user is predicted to be within a predetermined proximity of the individual. The proximity of the user to the individual may be determined based on a distance between the user and the individual, such as a straight-line distance or a distance along a route such as streets, sidewalks, and so forth. The proximity may also be based on an amount of travel time between the user and the individual, e.g., an amount of walking time, driving time, or other transportation time. In an embodiment, the proximity of the individual is determined based on a distance and/or amount of travel time between the other individual and a point along a route the user is predicted to travel. The proximity may also be determined based on an amount of distance and/or travel time required to deviate from the predicted route in order to meet up with the other individual.

The future time may be determined based on contextual information associated with the user. The contextual information may include information such as calendar information, scheduled events, other reminders, known routes historically traveled by the user and/or the times they were traveled, known locations historically visited by the user and/or the times they were visited, and so forth. Similarly, known information about the other individual may be used to predict the other individual's location. This may include both: (1) information that is known within the user's contextual information without requiring access to the other individual's personal information (e.g., a calendar invite that includes the individual, a home location for the individual, a work location for the individual, etc.); and (2) information that would require access to the other individual's personal information (e.g., calendar information, reminders, current GPS from the individual's mobile device, and so forth.) The other individual's personal information may be accessible based on permission granted by the other individual. A time to trigger the reminder for presentation to the user is determined, and may be determined to occur some period of time prior to the future time when the user is predicted to be within proximity of the individual. The time to trigger the reminder may be a specific predetermined time, or may be based on a geofence, such as when the user leaves from or arrives at a particular location. In an embodiment, inference engine 518 provides the trigger time to reminder component 510, which associates it with the reminder, and which may determine when the time for triggering the reminder has occurred, e.g., that the current time corresponds to a particular predetermined time, or based on a geofence.

In an embodiment, data collection component 516 includes one or more computing devices and is configured to collect contextual information associated with the user. Data collection component 516 may comprise one or more applications or services on a user device, across multiple user devices, or in the cloud. In an embodiment, the contextual information includes user preferences, identification of individuals associated with the user, frequently visited locations, frequently traveled routes, locations associated with events, locations associated with the user, the user's current location, and so forth. The contextual information may be collected or derived from a variety of sources. In some embodiments, the contextual data may be obtained from one or more sensors, such as sensors providing smartphone data, home-sensor data, GPS data, vehicle signal data, wearable device data, user device data, gyroscope data, accelerometer data, calendar data, email data, schedule data, credit card usage data, purchase history data, weather data, other sensor data that may be sensed or otherwise detected by a sensor (or detector) component, derived from a sensor component associated with the user or an event (including location, motion, orientation, position, user-access, user-activity, network-access, device-charging, or other data that is capable of being provided by one or more sensor component) and many more.

In an embodiment, assistant service component 514 includes one or more computing devices and is configured to surface contextually relevant reminders and related content to a user, based on reminder data determined by reminder component 510, user profile data from user profile storage 512, and/or other contextual data about the user. Assistant service component 514 may comprise one or more applications or services on a user device, across multiple user devices, in the cloud, or a combination thereof. For example, in one embodiment, assistant service component 514 manages the presentation of reminders to a user across multiple user devices 520 associated with that user. Based on reminder data and user contextual data, assistant service component 514 may determine on which user device(s) 520 a reminder is presented, as well as the context of the presentation, including how it is presented (or in what format and how much content, which can be dependent on the user device or context), when it is presented, and what supplemental content is presented with it. In particular, in some embodiments, assistant service component 514 applies utilizes sensed user data and contextual information in order to determine the presentation of reminders.

In some embodiments, assistant service component 514 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. Some embodiments of assistant service component 514 capture user responses to notifications or user activity associated with notifications.

User device 520 may comprise any type of computing device capable of use by a user. For example, in one embodiment, user device 520 may be similar to computing device 100 described below with regard to FIG. 1. By way of example and not limitation, a user device may be embodied as a personal computer, a laptop computer, a mobile or mobile device, a smartphone, a tablet computer, a smart watch, a wearable computer, a personal digital assistant (PDA), an MP3 player, GPS or device, video player, handheld communications device, gaming device or system, entertainment system, vehicle computer system, embedded system controller, remote control, appliance, consumer electronic device, a workstation, or any combination of these delineated devices, or any other suitable device.

Figure 1:
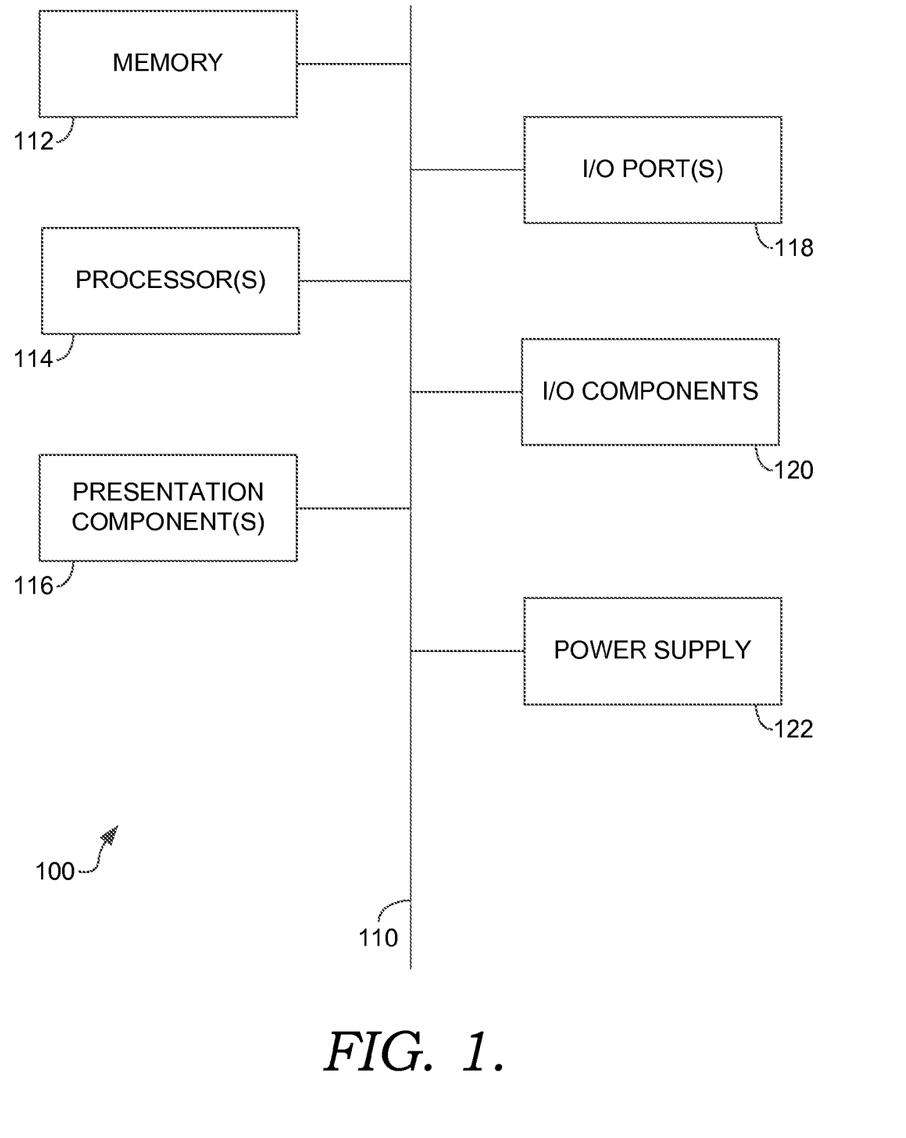
FIG. 1 depicts an exemplary operating environment suitable for use with an embodiment of the present invention.

Referring now to FIG. 1, an exemplary operating environment for implementing an embodiment of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Some embodiments of the invention may be described in the general context of computer code or machine-useable instructions, including computer-executable instructions such as program modules, being executed by a computer or other machine, such as a personal digital assistant or other handheld device. Generally, program modules including routines, programs, objects, components, data structures, etc., refer to code that performs particular tasks or implements particular abstract data types. Some embodiments of the invention may be practiced in a variety of system configurations, including handheld devices, consumer electronics, general-purpose computers, more specialty computing devices, etc. Some embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. As used herein, computer-storage media does not include signals per se.

Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method of triggering presentation of a reminder on a mobile device, comprising:
   accessing, via a processing device, the reminder that is stored in one or more computer storage media, wherein the reminder describes a task associated with a user of the mobile device, wherein the task described in the reminder is not defined with respect to a specific time;
   identifying an individual associated with the task, wherein the individual is a person other than the user;
   predicting a future time at which the user will be within proximity of the individual;
   determining a time to trigger the reminder for presentation to the user, such that the time to trigger the reminder occurs before the future time at which the user is predicted to be within proximity of the individual;
   determining that the time for triggering the reminder has occurred; and
   based on the determination that the time for triggering the reminder has occurred, causing the reminder to be presented on the mobile device.

2. The method of claim 1, wherein predicting the future time at which the user will be within proximity of the individual comprises:
   accessing calendar information associated with the user;
   identifying an event from the calendar information of the user, wherein the event is associated with the individual and has a scheduled future time; and
   identifying the scheduled future time of the event as the future time at which the user is predicted to be within proximity of the individual.

3. The method of claim 2, wherein the event is a separate event from the task.

4. The method of claim 1, wherein the time to trigger the reminder is determined by:
   predicting a future location of the user at which the user will be in proximity of the individual at the predicted future time;
   identifying a starting location of the user;
   predicting a route the user will travel from the starting location to the future location;
   determining an amount of travel time along the predicted route from the starting location to the future location; and
   determining the time to trigger the reminder based at least in part on the amount of travel time.

5. The method of claim 4, wherein predicting the route the user will travel from the starting location to the future location comprises:
   accessing user profile data associated with the user;
   identifying one or more routes the user has historically traveled from the starting location to the future location;
   determining a most likely route from the one or more routes the user has historically traveled, based on a probability associated with each of the one or more routes; and
   identifying the most likely route as the predicted route the user will travel from the starting location to the future location.

6. The method of claim 4, wherein identifying the starting location of the user comprises identifying a current location of the user as the starting location of the user.

7. The method of claim 4, wherein identifying the starting location of the user comprises:
   accessing user profile data associated with the user;
   identifying historical travel patterns of the user from the user profile data;
   predicting a second future location of the user where the user will be located prior to the predicted future time, based at least in part on the historical travel patterns of the user;
   identifying the predicted second future location as the starting location of the user.

8. The method of claim 1, wherein once triggered, the reminder is configured to persist during a period of time prior to the predicted future time at which the user will be within proximity of the individual.

9. A system for triggering presentation of a calendar event reminder on a mobile device, comprising:
- one or more computer-storage media configured to store calendar information associated with a user of a user device;
- a data collection component comprising one or more processing devices configured to collect contextual information associated with the user;
- one or more computer-storage media configured to store the contextual information associated with the user;
- an inference engine comprising one or more processing devices configured to
  - access an event reminder that describes a task associated with a user of a user device, wherein the task described in the event reminder is not defined with respect to a specific time;
  - identify an individual associated with the task, wherein the individual is a person other than the user;
  - determine a future time at which the user is predicted to be within a predetermined proximity of the individual;
  - determine a time to trigger the reminder for presentation to the user, wherein the time to trigger the reminder occurs a period of time prior to the future time at which the user is predicted to be within the predetermined proximity of the individual;
- a reminder surfacing component comprising one or more processing devices configured to
  - determine that the time for triggering the reminder has occurred; and
  - cause the reminder to be presented on the mobile device.

10. The system of claim 9, wherein determine the future time at which the user is predicted to be within the predetermined proximity of the individual comprises:
- access calendar information associated with the user;
- access calendar information associated with the individual;
- identify a first event from the calendar information of the user associated with a first location and a first time;
- identify a second event from the calendar information of the individual associated with a second location and a second time;
- determine that the first location is within a proximity of the second location;
- determine that the first time is within a proximity of the second time; and
- identify a time associated with the first event or a time associated with the second event as the future time at which the user is predicted to be within the predetermined proximity of the individual.

11. The system of claim 10, wherein the first event and the second event are independent with respect to each other.

12. The system of claim 9, wherein to determine the period of time prior to the future time at which the user is predicted to be within the predetermined proximity of the individual, the inference engine is further configured to:
- identify a current location of the user;
- identify a future location at which the user is predicted to be within the predetermined proximity of the individual;
- determine a route the user is predicted to travel from the current location to the future location;
- determine an amount of travel time along the route from the current location to the future location; and
- determine the period of time prior to the future time at which the user is predicted to be within the predetermined proximity of the individual based at least in part on the amount of travel time.

13. A method of triggering presentation of a calendar event reminder, comprising:
- by way of one or more processing devices:
  - accessing an event reminder that is stored in an information storage associated with a scheduling application, wherein the event reminder describes an event associated with a user of a user device;
  - identifying an individual associated with the event, wherein the individual is a person other than the user;
  - determining a predicted future time at which the user will be within a predetermined proximity of the individual at a point along a predicted route the user will travel, wherein determining the predicted future time comprises:
    - determining the predicted route the user will travel at a first future time;
    - determining a predicted location of the individual at a second future time;
    - determining that the point along the predicted route is within the predetermined proximity of the predicted location of the individual;
    - determining that the user will reach the point along the predicted route while the individual is at the predicted location of the individual;
    - identifying a time associated with when the user will reach the point along the route as the predicted future time when the user will be within the predetermined proximity of the individual;
  - determining a time to trigger the reminder for presentation to the user, wherein the time to trigger the reminder is determined to occur a period of time prior to the predicted future time when the user will be within the predetermined proximity of the individual;
  - determining that the time to trigger the reminder has occurred; and
  - based on the determination that the time for triggering the reminder has occurred, causing the reminder to be presented to the user.

14. The method of claim 13, wherein determining the predicted route the user will travel at the first future time is based at least in part on one or more of:
- calendar information associated with the user;
- user profile information associated with the user; or
- one or more historical travel patterns associated with the user.

15. The method of claim 13, wherein determining the predicted location of the individual at the second future time is based at least in part on one or more of:
- calendar information associated with the individual;
- user profile information associated with the individual; or
- one or more historical travel patterns associated with the individual.

16. The method of claim 13, wherein a destination location of the predicted route to which the user is predicted to travel is independent of the location where the individual is predicted to be located.

17. The method of claim 13, wherein determining the route the user is predicted to travel at the first future time comprises:
- identifying a route that the user is currently traveling;
- determining a predicted remainder of the current route that the user will travel; and identifying the predicted remainder of the current route as the route the user is predicted to travel at the first future time.

18. The method of claim 13, wherein the predicted route is a route that is suggested to the user.

19. The method of claim 13, wherein the event described in the event reminder is not defined with respect to a specific time.

20. The method of claim 13, wherein once triggered, the reminder is configured to persist during a period of time prior to the predicted future time at which the user will be within a predetermined proximity of the individual.

* * * * *